Patented Oct. 12, 1954

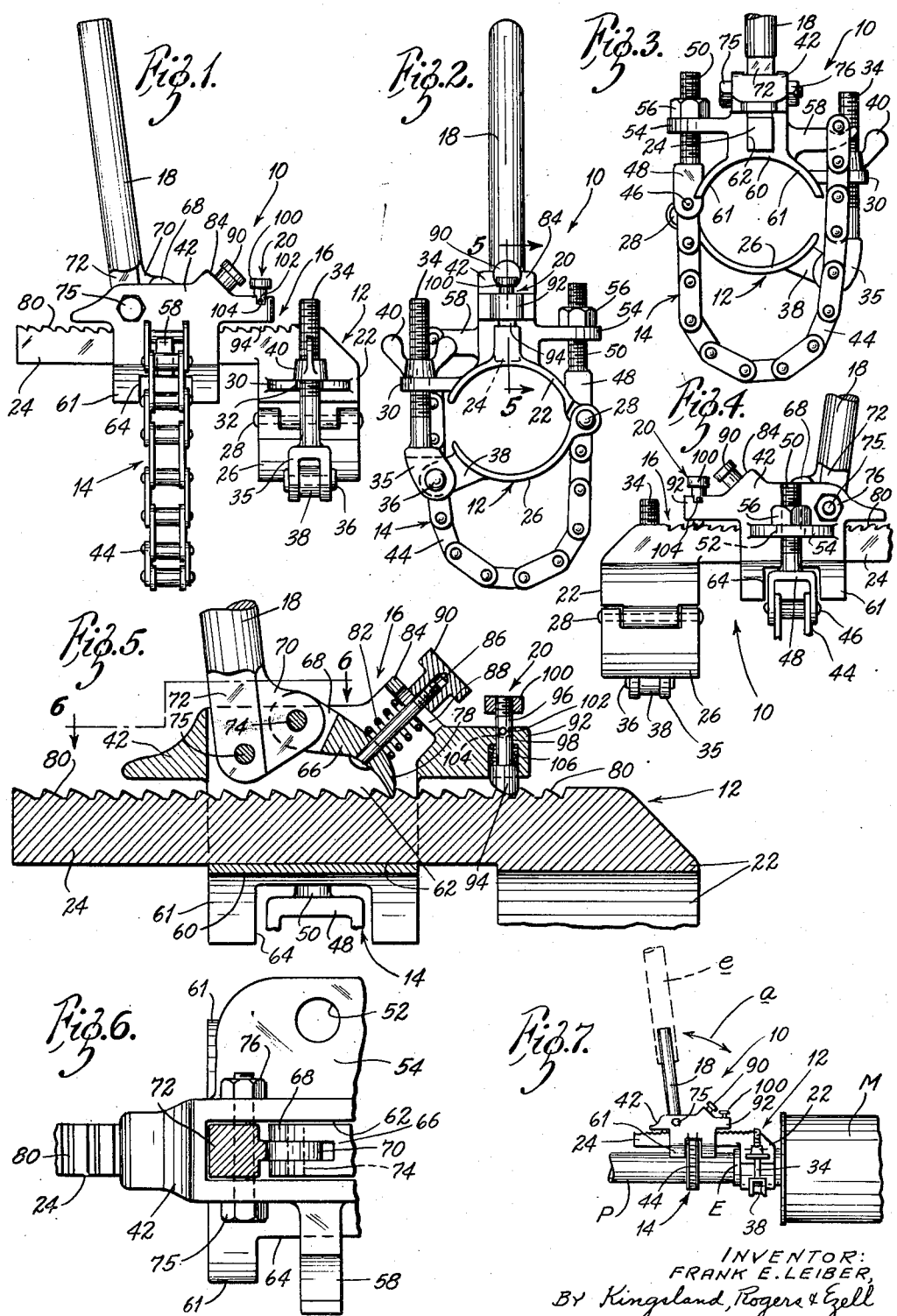

2,691,211

UNITED STATES PATENT OFFICE 2,691,211

DEVICE FOR USE IN REMOVING TAIL AND
EXHAUST PIPES FROM MUFFLERS

Frank E. Leiber, Lebanon, Ill.

Application April 7, 1952, Serial No. 281,001

3 Claims. (Cl. 29—237)

The present invention is concerned with a novel and improved device for use in the disconnection of telescopically united tubular members which, due to corrosion or the like, are not separable by the application of manual energy.

More particularly, the invention relates to a device for mechanically removing tail and exhaust pipes from the mufflers associated with internal combustion engines of automotive vehicles.

It is well known that exhaust gases of such engines are laden with vapors which liquefy as they cool and simultaneously pass through the muffler to atmosphere. In so doing, an internal accretion of corrosion about the telescoped segments of said muffler and the tail and exhaust pipes is inevitable. Furthermore, road splash and the like eventually results in an external accretion of corrosion about the telescopic joints of muffler assembly, as is understood.

Consequently, when the resultant deterioration requires repair or replacement of one or more of the elements included in said assembly, it is desirable to separate the worn element or elements from the assembly without damaging the remainder, or further damaging the element being removed, especially should the latter warrant repair instead of replacement.

The primary object of this invention, therefore, is to provide a novel and efficient device for performing such operations. To this end, the invention includes a first clamp assembly adapted for mounting on the front or the rear cylindrical extension of a muffler, a second clamp assembly adapted for mounting on the exhaust or the tail pipe of a muffler; and a rack and ratchet assembly for effecting the axial separation of the pipes from the muffler, as will appear.

Objects, features and advantages of the invention not specifically set forth above will be apparent or pointed out in the detailed description thereof to follow, reference being had also to the accompanying drawing, wherein:

Fig. 1 is a view in side elevation of a device incorporating the instant invention;

Fig. 2 is a right end elevational view thereof;

Fig. 3 is a left end elevational view thereof;

Fig. 4 is a view similar to Fig. 1, with some portions broken away, portraying the appearance of the opposite side of the device;

Fig. 5 is an enlarged view in vertical section taken on the line 5—5 in Fig. 2;

Fig. 6 is a fragmenatry plan view, partly in horizontal section and taken on the line 6—6 in Fig. 5, a chain included in a clamping assembly being omitted for clarification of certain structural details; and Fig. 7 is a view on a reduced scale, demonstrating the device in use to effect the removal of a tail pipe from a muffler.

With particular reference to Figs. 1 through 4, the device embodying the invention is generally designated 10. Broadly, it includes a first clamp assembly 12 whereby the entire device may be mounted on a muffler extension; a second clamp assembly 14 adapted to embrace a tail exhaust pipe; a rack and ratchet assembly 16 operable by means of a handle 18; and a detent assembly 20.

As best seen in Figs. 1, 2, and 5, the clamp assembly 12 includes an upper arcuate section 22 which is integrally formed on one end of a rack bar 24 of the assembly 16, and a lower arcuate section 26 hingedly connected at 28 to the upper section 22. A laterally projecting lug 30, integral with said upper section 22, is provided with a notch 32 for the reception of a threaded rod 34. A bifurcated lower end 35 of this rod 34 has a pivotal connection at 36 with a lug 38 integral with the lower section 26. A wing nut 40, in engagement with the threaded rod 34, maintains the latter in adjusted position, as will appear.

The clamp assembly 14 is in part mounted on opposite sides of and in part is formed integral with a hollow casting or housing 42 included in the assembly 16. The clamp assembly 14 includes a chain 44 having a swivel connection 46 at one end with the lower bifurcated extremity 48 of a threaded rod 50. The rod 50 extends freely through an opening 52 (Figs. 4 and 6) formed in a lug 54 formed integral with and projecting from the housing 42, and has a nut 56 applied thereto above said lug 54. Opposite the lug 54, the housing 42 carries an integral laterally projecting hook 58 for the reception of the free end of the chain 44. The body portion of the housing 42 includes an arcuate base section 60 from which extend integral arcuate flanges 61, and has formed therein a longitudinal opening 62 through which the rack bar 24 extends. The arcuate flanges 61 are preferably cut out at 64 to provide adequate clearance for the chain 44.

In addition to the rack bar 24, the assembly 16 includes a pawl or ratchet 66, which, as illustrated in Figs. 5 and 6, is disposed in the opening 62 above said rack bar 24. One end 68 of said ratchet 66 is bifurcated to receive a flat extension 70 formed on the lower squared end 72 of the operating handle 18, and a pivot pin 74 extends through aligned openings in said bifurcated end 68 of the ratchet and said extension 70. The lower end 72 of the handle 18 is pivotally mounted on the smooth shank portion of a transverse bolt 75 held in place by a nut 76.

A free end 78 of the ratchet 66 is biased into constant engagement with teeth 80 of the rack bar 24 by a compression spring 82 which is interposed between the ratchet 66 and an inclined wall 84 of the housing 42. A headed angularly disposed pin 86, mounted in the free end of the ratchet 66 as shown, extends upwardly inside the convolutions of the spring 82 and projects through an elongated slot 88 provided in the wall 84. The projecting extremity of the pin 86 threadedly receives a manually rotatable nut 90, whereby the force of the spring 82 may be regulated, as should be manifest.

The assembly 20 is supported in a nosing 92 integral with the housing 42 and disposed above the rack teeth 80, and includes a detent 94 having a reduced upwardly extending stem 96 which extends through and beyond an opening 98 formed in the nosing 92. A suitable knob or fingerpiece 100 is secured to the projecting end of the stem 96. A crosspin 102 carried by the stem 96 cooperates with a pair of grooves or notches 104 formed in the top face of the nosing 92 to prevent rotation of the detent 94. The detent 94 is biased toward engagement with the rack bar teeth 80 by a compression spring 106.

*Operation*

A visual demonstration of the device 10 in use is given in Fig. 7. In this illustration, the rear end portion of a conventional muffler M has a cylindrical sleeve or extension E into which the forward end of the tail pipe P had originally been press-fitted.

Assuming now that, due to corrosion and so on, it is desired to remove the tail pipe, the device 10 is first applied as illustrated.

In other words, the assembly 12 is first clamped about the extension E, whereupon the assembly 14 is clamped in position about the tail pipe P.

With reference to the first-named assembly 12, it should be manifest that rotation of the wing nut 40 in the proper direction after the disposition of arcuate sections 22 and 26 about the extension E followed by the swinging of rod 34 into slot 32 will insure a non-yielding clamping arrangement. It should further be manifest that this arrangement is flexible, so that variations in muffler extension diameters cannot impair its efficiency.

With reference to the second assembly 14, it incorporates a two-fold adjustment whereby to insure positive clamping action. In other words, the chain 44, after being trained around the lower periphery of the tail pipe P as tightly as possible by hand, may have its free end brought to anchor on the hook 58 with the latter engaging under the most appropriate of the chain link pins, as is understood. Thereupon, proper rotation of the nut 56 will serve to take up any remaining slack in the chain, so that, in conjunction with the arcuate section 60 and arcuate flanges 61, a positive flexible clamping arrangement for the pipe P is also provided.

It is noted at this point that tests have demonstrated numerous advantages inherent in a chain as compared to a rigid bottom clamp. Among these are ease of mounting, greater range of adjustability, and non-slippage in that the links tend to bite into the metal periphery of the pipe.

Assuming now that the clamping assemblies are in position, the pipe P is gradually moved to the left, as viewed in Fig. 7, by the manual reciprocation of operating handle 18 as suggested by the two-pointed arrow $a$. In other words, and with reference also to Fig. 5, each time the handle 18 is swung to the left about its pivot 75, the ratchet 66 will ride over the apex of one or more of the teeth 80 to the left, and each time said handle is swung to the right about said pivot, the housing 42 and its associated clamp assembly 14 will be propelled leftwardly, that is, away from the muffler M. An extension suggested by broken lines and designated $e$ in Fig. 7 may be employed to provide greater leverage for the initial reciprocations of the handle 18. The elongated slot 88 shown in Fig. 6 is provided to accommodate the movements of the pin 86.

It is manifest that the relationship between the long handle 18 and the very short extension 70 provides a mechanical advantage through which a tremendous force is readily applied to the ratchet 66 at the pivot pin 74. Hence, even very stubborn tail and exhaust pipes may be removed with the device 10.

During a pipe removal operation, the assembly 20 will progress leftwardly from tooth to tooth each time the handle 18 is moved clockwise, and will thereupon maintain the housing 42 in its advanced position during the succeeding counterclockwise movement of said handle 18.

Following the completion of a pipe removal operation and in preparation for a similar future operation, the housing 42 and its associated elements may again be brought to the position thereof illustrated in Fig. 5 by manually raising first the fingerpiece 100 and then the nut 90.

From the foregoing description augmented by the drawing, it should be apparent that this invention discloses a device which is simple in design, which does not require any particular skill for the successful operation thereof, and which is adaptable for universal use in the field of operations to which it is directed.

It is, of course, to be understood that the embodiment of the invention illustrated and described may be modified in some respects, without departing from the spirit thereof. Therefore, the scope of the invention is to be limited only as defined by the appended claims.

What is claimed is:

1. A device for separating a pair of telescopically joined tubular members, said device comprising a first and a second clamping assembly, said first clamping assembly including an elongated bar-like element provided with ratchet teeth, an arcuate clamping element integral with said bar-like element and disposed at one end of the latter, adjustable means connected with said clamping element and adapted to cooperate therewith in securing said first clamping element to one of said telescopically joined members so that said bar-like element may extend parallel to and beyond the same, said second clamping assembly including a ratchet housing provided with an opening extending longitudinally therethrough for slidably receiving the free end of said bar-like member, an arcuate clamping element integral with said housing and disposed parallel with said opening, adjustable means connected with said housing and adapted to cooperate with the arcuate clamping element integral therewith in securing said second clamping assembly to the other of said telescopically joined members so that said opening may accommodate a portion of said bar-like member, said housing being further provided with a second opening communicating generally perpendicularly with said elongated opening, said second opening being opposite said ratchet teeth when said bar-like element extends through said elongated opening, an elongated lever having one end pivotally mounted within said second opening, an eccentric extension formed on said one end of said lever, a pawl member pivotally mounted to said eccentric extension and having a free end adapted to engage said ratchet teeth, spring means interposed between said pawl member and a wall of said housing for yieldably biasing the former into engagement with said teeth, and a detent assembly movably supported by said housing for yieldable engagement with said teeth.

2. The device of claim 1 wherein the second opening is defined in part by an inclined wall of the housing, said inclined wall having a slot formed therein, a pin having a head at one end and threads at the other end disposed so as to pass through said pawl, said spring means, and said slot, and a nut threadedly engaging the pin and abutting the exterior surface of said inclined wall.

3. The device of claim 2 wherein the housing has a nose portion extending parallel to and beyond the longitudinally extending opening therein, said nose portion having a counterbored opening extending perpendicularly therethrough for supporting said detent assembly, said detent assembly comprising a detent slidably disposed in the counterbored portion of said counterbored opening, a stem on said detent extending from the latter through and beyond the counterbored opening, a knob secured to the projecting end of said stem, a compression spring disposed within said counterbored portion, around said stem, and abutting said detent, and a crosspin extending perpendicularly through said stem adjacent an external surface of said nose portion, said external surface being grooved to accommodate said crosspin.

References Cited in the file of this patent

UNITED STATES PATENTS

| Number | Name | Date |
|---|---|---|
| 945,334 | Lent | Jan. 4, 1910 |
| 1,587,689 | Weiss et al. | June 8, 1926 |
| 1,596,464 | Smith | Aug. 17, 1926 |
| 1,894,835 | Smith et al. | Jan. 17, 1933 |
| 2,229,839 | Crewe | Jan. 28, 1941 |